US012613520B2

(12) United States Patent
Sulzer et al.

(10) Patent No.: US 12,613,520 B2
(45) Date of Patent: Apr. 28, 2026

(54) LIVE DRONE AEGIS AND AUTONOMOUS DRONE RESPONSE

(71) Applicant: ZeroEyes, Inc., Conshohocken, PA (US)

(72) Inventors: Timothy Sulzer, Jenkintown, PA (US); Marcus Day, Jenkintown, PA (US); Samuel Mohebban, Washington, DC (US); Quinn Graehling, Columbus, OH (US); Kieran Carroll, Penn Valley, PA (US)

(73) Assignee: ZeroEyes, Inc., Conshohocken, PA (US)

( * ) Notice: Subject to any disclaimer, the term of this patent is extended or adjusted under 35 U.S.C. 154(b) by 159 days.

(21) Appl. No.: 18/210,105

(22) Filed: Jun. 15, 2023

(65) Prior Publication Data

US 2023/0409033 A1 Dec. 21, 2023

Related U.S. Application Data

(60) Provisional application No. 63/352,281, filed on Jun. 15, 2022, provisional application No. 63/352,289, filed on Jun. 15, 2022.

(51) Int. Cl.
*G05D 1/00* (2024.01)
*G06V 20/58* (2022.01)
(52) U.S. Cl.
CPC ......... *G05D 1/0094* (2013.01); *G05D 1/0022* (2013.01); *G05D 1/0088* (2013.01); *G06V 20/58* (2022.01)

(58) Field of Classification Search
CPC ...... G06V 10/40; G06V 10/70; G06V 10/764; G06V 10/765; G06V 10/776; G06V 10/82;
(Continued)

(56) References Cited

U.S. PATENT DOCUMENTS 11,308,335 B2    4/2022  Sulzer et al.
12,087,059 B1 *  9/2024  Gordon .................. G06V 20/70
(Continued)

OTHER PUBLICATIONS

International Search Report and Written Opinion dated Sep. 21, 2023, of counterpart International Application No. PCT/US2023/25359.
International Preliminary Report on Patentability of the International Searching Authority and Written Opinion mailed Dec. 26, 2024, of counterpart International Application No. PCT/US2023/02359.

*Primary Examiner* — Brandon Z Willis
(74) *Attorney, Agent, or Firm* — DLA Piper LLP (US)

(57) ABSTRACT
A machine learning ("ML") model may be used to detect a presence of an object in one or more frames received from a camera sensor. The ML model may insert bounding boxes around the object and annotate the bounding boxes with one or more attributes of the object. The one or more frames and the annotated bounding boxes may be stored in a database configured to be searchable by at least one attribute of the one or more attributes. It may be determined whether the object is true positive ("TP") event or a false positive ("FP") event. The ML model may be re-trained using one or more of the database and the determination. If the object is a TP event, an alert may be transmitted to one or more devices with a location of the object that is based off of location information received from the camera sensor.

20 Claims, 7 Drawing Sheets

600

CAPTURE FOOTAGE FROM FIRST MAV — 602

PERFORM METHOD 200 USING IVS SYSTEM VIA ONBOARD CPU/GPU AND GENERATE ALERT, WHICH IS THEN VERIFIED — 604

TRANSMIT VERIFIED ALERT TO SECOND MAV — 608

LAUNCH SECOND MAV AND VECTOR TO OBJECT OF INTEREST BASED ON SENSOR INFORMATION FROM STATIONARY SECURITY CAMERA — 608

FIRST MAV AND/OR SECOND MAV TRACKS AND/OR INTERVENES WITH OBJECT OF INTEREST — 610

(58) Field of Classification Search
CPC ........ G06V 20/17; G06V 20/52; G06V 20/58;
G06V 20/46; G06N 3/08; G06N 20/00;
G05D 1/0094; G05D 1/0022; G05D
1/005; G05D 1/0088; G05D 1/0202;
G05D 1/617; G05D 1/683; G05D 1/689;
G05D 2105/55; G05D 2109/20; B64U
2101/30; B64U 2101/31; B64U 2201/10;
G08B 13/194; G08B 13/19647; G08B
13/1965; G08B 13/19671; G08B 29/186
See application file for complete search history.

(56)                     References Cited

U.S. PATENT DOCUMENTS

2016/0019427 A1 *   1/2016  Martin ................... G06V 40/10
                                                 382/103
2018/0233009 A1 *   8/2018  Spector ................... G05D 1/12
2018/0341262 A1 *  11/2018  Yeshurun ............. G05D 1/0094
2020/0364468 A1 *  11/2020  Sulzer ................... G06F 18/217
2021/0117724 A1 *   4/2021  Taheri ................... G06V 30/274
2023/0252791 A1 *   8/2023  Webb ................... G06V 10/776
                                                 382/159
2023/0409054 A1 *  12/2023  Bradley ................. G05D 1/106

* cited by examiner

300

CAPTURE FOOTAGE FROM MAV — 302

TRANSMIT FOOTAGE TO SERVER SYSTEM
CONFIGURED TO RUN IVS SYSTEM — 304

PERFORM METHOD 200 AT SERVER SYSTEM TO
DETECT OBJECT OF INTEREST AND GENERATE ALERT,
WHICH IS THEN VERIFIED — 306

TRANSMIT VERIFIED ALERT TO DEVICES — 308

500

CAPTURE FOOTAGE FROM MAV — 502

PERFORM METHOD 200 USING IVS SYSTEM VIA
ONBOARD CPU/GPU AND GENERATE ALERT,
WHICH IS THEN VERIFIED — 504

TRANSMIT VERIFIED ALERT TO DEVICES — 506

600

CAPTURE FOOTAGE FROM FIRST MAV — 602

PERFORM METHOD 200 USING IVS SYSTEM VIA
ONBOARD CPU/GPU AND GENERATE ALERT,
WHICH IS THEN VERIFIED — 604

TRANSMIT VERIFIED ALERT TO SECOND MAV — 608

LAUNCH SECOND MAV AND VECTOR TO OBJECT OF
INTEREST BASED ON SENSOR INFORMATION
FROM STATIONARY SECURITY CAMERA — 608

FIRST MAV AND/OR SECOND MAV TRACKS
AND/OR INTERVENES WITH OBJECT OF INTEREST — 610

700

710 — PROCESSOR(S)

720 — MEMORY

730 — I/O

740 — SENSOR(S)

750 — UI(S)

760 — ACTUATOR(S)

1

LIVE DRONE AEGIS AND AUTONOMOUS DRONE RESPONSE

CROSS-REFERENCE TO RELATED APPLICATIONS

This application claims benefit to U.S. Provisional Patent Application. No. 63/352,281 entitled "Autonomous Drone Response," and U.S. Provisional Patent Application. No. 63/352,289 entitled "Live Drone AEGIS," both of which were filed on Jun. 15, 2022. The entirety of these applications are hereby incorporated herein by reference.

TECHNICAL FIELD

The present disclosure is generally directed to the use of artificial intelligence ("AI") and machine learning ("ML") models in systems and methods for intelligent video surveillance ("IVS") and object detection and the generation of an appropriate response.

BACKGROUND

Many homes, schools, shopping malls, businesses, parks, public spaces, and organizations, etc. employ some type of video surveillance systems intended to ensure the safety of the people inside and/or around the area being watched. In particular, an interloper with a weapon intending to do harm is a too well known threat for which rapid detection of the weapon is of paramount importance in order to prevent or minimize harm to others in the area. However, the typical video surveillance systems rely on a person monitoring a video stream, usually of multiple stationary cameras, and thus the level of security is dependent on the attentiveness, perception, a camera's static field-of-view, and level of training of the person monitoring the video output.

Typically, the person monitoring the video streams has little or no formal training regarding recognizing and/or detecting a weapon being carried by an interloper or other objects/vehicles of interest. Additionally, the monitoring person may be watching a computer screen showing multiple video streams (four, nine, sixteen, or more) thereby overloading the ability of the person to accurately discern the presence of a weapon and further handicapping the person by presenting them with multiple poor resolution images. Therefore, even if the person monitoring the video streams is well trained, the likelihood that the person will recognize an object of interest is severely diminished. Even if a monitoring system uses technology to supplement human review, video streams from a mobile image sensor may pose a challenge for analysis as the parameters are constantly changing.

SUMMARY

Additional features and advantages of the disclosure will be set forth in the detailed description, claims, and drawings, and in part will be readily apparent to those skilled in the art. It is to be understood that both the foregoing general description and the following detailed description present various examples of the disclosure, and are intended to provide an overview or framework for understanding the nature and character of the claims. The accompanying drawings are included to provide a further understanding of the disclosure, and are incorporated into and constitute a part of this specification. The drawings illustrate various examples of the disclosure and together with the description serve to explain the principles and operations of the disclosure.

Systems, methods, apparatuses and non-transitory computer executable media configured to detect an object and initiate a response are described herein.

A video stream may be received from a camera sensor, which may be stationary and/or one that is in motion (e.g., incorporated into a MAV). A set of frames from the video stream may be selected. A machine learning model may be used to detect a presence of an object in one or more frames of the set of frames. The machine learning model may insert bounding boxes in an area of the object in each of the one or more frames. The machine learning model may annotate the bounding boxes with one or more attributes of the object. The one or more frames and the annotated bounding boxes may be stored in a database configured to be searchable by at least one attribute of the one or more attributes. It may be determined whether the object is true positive ("TP") event or a false positive ("FP") event. The machine learning model may be re-trained using one or more of the database and the determination. If it is determined that the object is a TP event, an alert may be transmitted to one or more devices. The alert may include a location of the object that is based off of location information received from the camera sensor. In an example, the alert may trigger a MAV to be dispatched to the location.

BRIEF DESCRIPTION OF DRAWINGS

Other objects and advantages of the present disclosure will become apparent to those skilled in the art upon reading the following detailed description of exemplary embodiments and appended claims, in conjunction with the accompanying drawings, in which like reference numerals have been used to designate like elements, and in which:

The figures are for purposes of illustrating example embodiments, but it is understood that the inventions are not limited to the arrangements and instrumentality shown in the drawings. In the figures, identical reference numbers identify at least generally similar elements.

DETAILED DESCRIPTION

The following description of the present subject matter is provided as an enabling teaching of the present subject matter and its best, currently-known examples. Those skilled in the art will recognize that many changes can be made to the examples described herein while still obtaining the beneficial results of the present subject matter. It will also be apparent that for some examples, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of examples of the present subject matter may be directed towards or reference specific systems and/or methods, it is to be understood that the discussion is not intended to limit the scope of the present subject matter in any way and that the principles presented are equally applicable to other systems and/or methods.

Those skilled in the art will further appreciate that many modifications to the examples described herein are possible without departing from the spirit and scope of the present subject matter. Thus, the description is not intended and should not be construed to be limited to the examples given but should be granted the full breadth of protection afforded by the appended claims and equivalents thereto.

The present disclosure describes systems, methods, apparatuses and non-transitory computer executable media for an intelligent video system (IVS) configured to process live video from one or more surveillance cameras, which may be mounted to a stationary object or attached/incorporated into a mobile autonomous vehicle (MAV), such as an unmanned ground vehicle (UGV) or an unmanned aerial vehicle (UAV) or "drone." The IVS may analyze the live video using one on or more models to identify objects of interest (e.g., a weapon such as a handgun or rifle, a cell phone, a camera, and/or vehicle). Once an object of interest is detected, an alert may be generated and a MAV may be automatically dispatched to a location corresponding to the one or more surveillance cameras that captured the object of interest.

Figure 1:
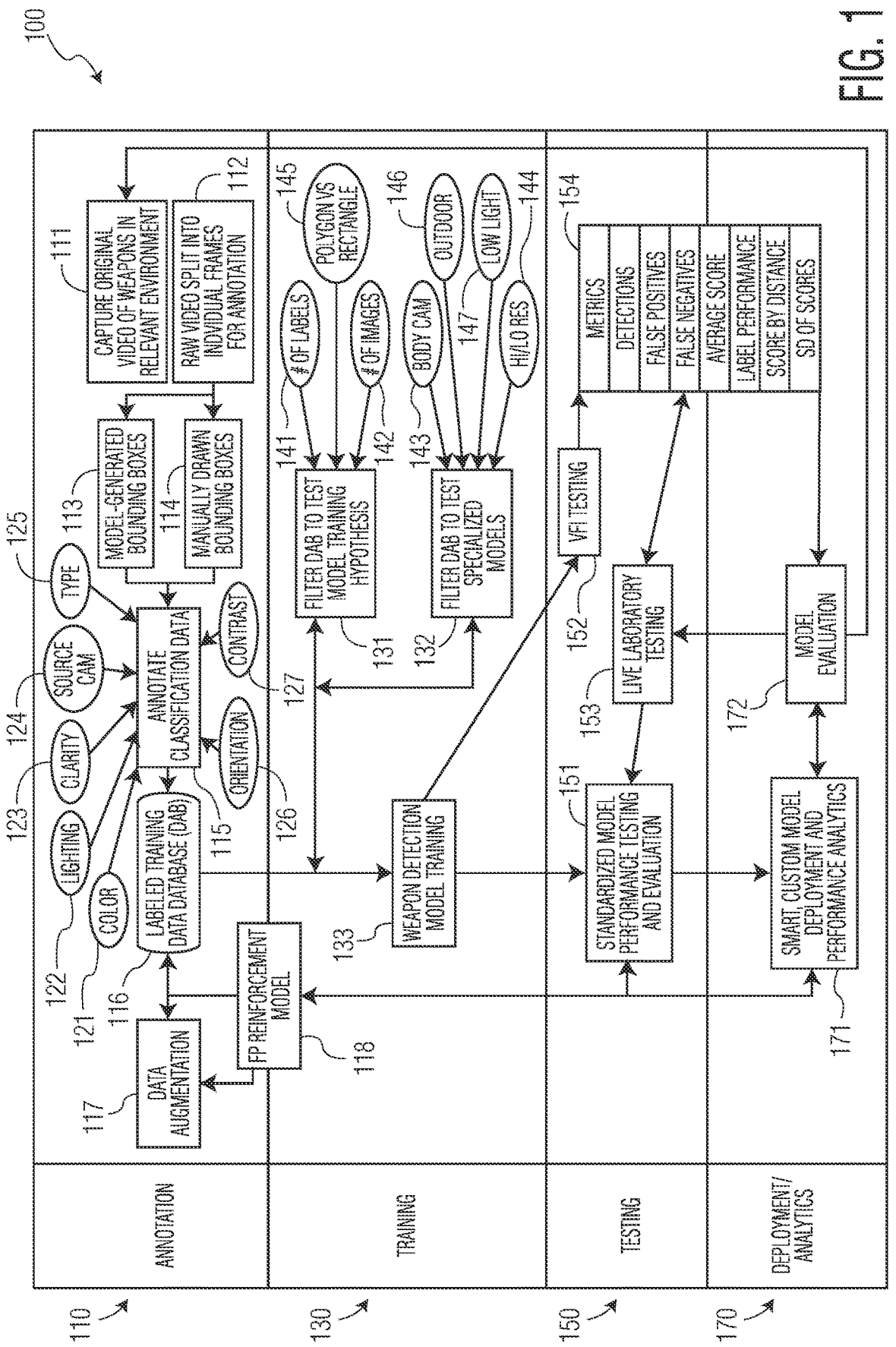
FIG. 1 is a functional diagram of an intelligent video surveillance (IVS) system, according to an example of the present disclosure.

Referring now to FIG. 1, a functional diagram of an IVS system 100 is shown. The IVS system 100 may perform real-time analytics on a live video stream, and may include at least one video surveillance system module having, for example: a video surveillance camera; a video encoder (e.g., a hardware encoder and/or a software encoder) to encode video gathered by the video surveillance camera; and a video analysis engine coupled to the video surveillance camera to analyze the live video stream gathered by the video surveillance camera and to create data derived from the video. The video analysis engine of the IVS system 100 may include one or deep learning models stored in one or more repositories and one or more databases (hereinafter "DAB") 116 configured to store data associated with recorded testing videos. The DAB 116 may be responsible for storing/retrieving all data generated for the purpose of model training and development and for formatting data into specific requested datasets based on the performance needs of a particular model.

In an example, the DAB 116 may be a specifically configured database and/or a software specifically configured to store and retrieve data in these databases. The datasets therein may be used to train the ML models. In addition, the DAB 116 may be a non-ML based service that captures meta data using one or more algorithms. As used herein, the DAB 116 may be a representation of a database that can contain multiple databases (e.g., hierarchal) that may be relied on by many different services. The DAB 116 may receive, process, and store generic, readily available data that may be harvested from online sources. In the case of computer vision models, there are several open-source datasets (i.e., ImageNet and Google's Open Image Dataset) that may be used. However, these open-source datasets may feature mediocre quality images that are not typical of realistic situations where actual particular objects need to be detected.

The available image data suitable for training the disclosed weapon detection deep learning models utilized by the IVS system 100 may be very limited and therefore not useful for actual detection situations. The majority of data available online often displays up-close, profile views of weapons, which may not be representative of the view of weapons in typical surveillance video. In the unique case of processing video almost exclusively from surveillance cameras, the data collection process may be further complicated due to the specific distances and camera angles that need to be represented in the dataset to enable the dataset to be used to train high-performing models. Low quality image inputs generally lead to low performing deep learning models. Accordingly, other sources of image data may be used to populate data in the DAB 116 and to train models capable of high accuracy in real-world environments.

In certain examples, the DAB 116 may receive data from one or more other sources. In an example, custom surveillance video footage may be recorded featuring actual weaponry (e.g., using a green screen to simulate actual environments). In another example, high-quality game development engines such as Unreal Engine (the engine used to create Fortnite and many other modern, highly-detailed graphic games) may be used to create photo-realistic scene replications of actual camera views from potential customers' surveillance cameras.

In various examples, hundreds of hours of surveillance footage (videos and/or still pictures) may be recorded, focusing on capturing as many different scenarios as possible. This surveillance footage may be used for training and testing, selecting, and/or improving various deep learning models as discussed below. Variables that may be taken into account while recording training data include, but are not limited to: time of day (dawn/dusk/night, shade/overcast/full sun, etc.), type of weapon used (a wide range of different pistols and rifles were recorded), and the position of the weapon (e.g., movement speed, distance, orientation, weapon visibility, etc.) Additionally, the following exemplary, non-exhaustive, list of factors for the surveillance footage that affect object detection were analyzed and/or tested.

TABLE 1

| Factors for Surveillance Footage | |
| --- | --- |
| Category | Factor |
| Environmental Factors | Time of day relating to light levels and potential for shadows (steep sun angles at dawn/dusk) Weather conditions (fog, rain, snow, overcast, full sun) |
| Camera and Hardware Factors | Camera filters and lighting settings (day vs night for infrared-iris, contrast, color vs black and white, etc.) Resolution (should represent a range of current standards, 1440p, 1080p, 720p, 480p, etc.) Frame rate (only matters if testing on video) |

TABLE 1-continued

Factors for Surveillance Footage

| Category | Factor |
|---|---|
| | Detection frame rate (only matters if testing on video) |
| | Lens type (wide angle, fisheye, standard) |
| | Noise (dust/condensation/glare on lens) |
| | Height and angle of camera (affects the visible orientation of the gun-average security camera at 10-12 ft) |
| Gun Factors | Size of gun (pixel area can be used as an approximation of distance from camera-would be good to define standards for weapon sizes at various distances |
| | Visibility (full, partially concealed, fully concealed, holstered, partially off camera) |
| | Material concealing the weapon(thickness/material of clothing/container thatmay be partially or fully obscuring view-important for solutions that attempt to detect fully concealed weapons) |
| | Orientation (vertical pointed up/down, angle up/down, profile view, top down view etc.) |
| | Color (metallic, black, blue, other color/materials) |
| | Contrast to clothing/background (in conjunction with other factors, i.e.-black weapon on black shirt in full sun) |
| | Specific gun models and/or categories: for long guns, assault rifle, semi-automatic rifle, AR-15 style rifle, AK-47 rifle, hunting rifle, long-range rifle, bullpup-style, shotgun, etc.; and for pistols-revolver, semi-auto, 3D-printed, etc. |
| Human Factors | Complexion (e.g., hand color) |
| | Object contrast to background |
| | Hand contrast to object |
| | Hand contrast to background |
| | Clothing color |
| | Bag color |
| | Cell phone color |

Once recorded, the surveillance footage may be exported either with lossy or lossless compression using formats such as, but not limited to, MJPG, H264, H265, PNG, JPG etc. The exported footage may be split into frames using, in a non-limiting example, the command line utility, FFmpeg. The individual frames may be reviewed for further processing. Processing too many frames may lead to datasets of unmanageable size and may cause overfitting/overtraining of a model due to training the model with large quantities of highly similar images. In various examples, the number of frames chosen for 1 second of video may be less than 5, between 2-5 (inclusive), between 1-4 (inclusive), between 1-3 (inclusive), between 1-2 (inclusive), and all subranges therebetween. In an example, the frames that maybe chosen are those that include the highest "quality" images based on one or more of the following factors: (1) visibility of the item of interest, (2) clarity of the image in the frame, (3) clarity of the item of interest, (4) orientation of the item of interest, (5) viewing angle of the camera taking the image, and combinations thereof. The frames may be chosen manually, or they may be chosen using one or more unsupervised means (e.g., using hashing and one or more ML models).

The chosen video frames may then be processed to include one or more of point samples, poly lines, bounding boxes, and/or bounding polygons and labels. Point samples may be a single point that represent the x and y coordinate of where the point is in a space. Poly lines may be similar to polygons, but they are not closed (i.e., they may be single lines drawn on the image which can contain a list of x, y coordinates). In an example, a bounding box may be rectangular in shape. In other examples, a bounding box may be polygonal in shape. Bounding boxes may be added to the chosen frames where the bounding boxes typically surround (fully or substantially completely) an object of interest, such as a rifle, pistol, or other weapon. Bounding polygons (such as a polygon that generally traces the outline of an object of interest) may be added to the chosen frames either instead of, or in addition to, a bounding box. Additionally, the chosen frames may be annotated with a unique set of weapon labels and/or attributes which may separate out labeled objects into subcategories and allow the deep learning models to identify similar weapons with different characteristics that reflect how those weapons are represented and later identified. As a non-limiting example, a handgun may be assigned the label "pistol" and may have a variety of attributes assigned to that label such as, but not limited to, color, the presence or absence of aiming sights, length, in or out of a holster, orientation, how the pistol is being held/pointed, etc. Polygons and bounding boxes may be used by the AI model, while poly lines and point samples may be used to collect metadata.

The IVS system 100 may train, detect, and/or identify an object of interest using one or more models according to examples of the present disclosure described herein. An Annotation Phase 110 of the IVS system 100 may include capturing original videos, either in an artificial environment and/or in relevant environments as discussed herein; annotating objects and attributes; applying automated bounding boxes/polygons to objects of interest; and then augmenting the data. A Training Phase 130 of the IVS system 100 may include filtering the database from the annotation phase where the filtering may be based on attributes, cameras, environments, etc., as discussed herein; and model training using bounding polygons and/or bounding boxes. A Testing Phase 150 of the IVS system 100 may use video file inference testing, as described herein, and/or live testing to determine model performance. A Deployment/Analytics Phase 170 of the IVS system 100 may include model evaluation and may incorporate a feedback loop between model performance and database composition.

The Annotation Phase 110 of the IVS system 100 may include one or more annotation processes. At block 111 original video may be captured in a relevant environment for the particular setting/location for which the model will be employed. This may be accomplished by a person carrying an object of interest, such as a weapon, appearing and/or passing through a field of view of a still or video camera. This may entail a person carrying a weapon in front of a camera at a client's site using video surveillance cameras already in place at the client site. At block 112, the original video, or portions thereof, may be split into individual frames for annotation. This may be done manually or it may be guided by a ML model that decides whether a frame should be included. At block 113, model-generated bounding boxes and/or bounding polygons may be added to some or all of the frames from block 112. At block 114, manually-generated bounding boxes and/or bounding polygons may be added to some or all of the frames from block 112. Both bounding boxes and bounding polygons may be added to some or all of the frames. At block 115, one or more of the frames may be annotated/labeled with classification data, as discussed herein. Some or all of the annotations may be automatically generated by the model, manually added by an operator, or both. The models may be run using different combinations/permutations of classification data. The classification data may include one or more of: at block 121, color (e.g., color of weapon, interloper's clothes, general environment, etc.); at block 122, lighting (e.g., day, night, overcast, ambient light, artificial light, combinations of lighting sources, etc.) levels may be categorized as low, medium, or high. In an example, a numerical representation of brightness may be generated based off an amplitude of individual pixels. At block 123, clarity (e.g., focus, resolution, level of pixelization, blurriness, etc.); at block 124, source camera information (e.g., location, height above ground, distance from and or size of an interloper with object of interest (either or both of which may be determined based, at least in part, on one or more of the camera resolution, the camera field of view, and mounted height of the camera, or may be determined in relation to an object in the field of view with the interloper), GPS coordinates, manufacturer, model (which may be used to determine camera resolution), frame rate, color/black and white, f-stop, saturation level, etc.); at block 125, type of object of interest (e.g., pistol, rifle, or other type of weapon); at block 126, orientation of the object of interest (e.g., how held, rotational orientation (which may be determined, for example, using a protractor), extended from body, holstered, covered, etc.). This may be automated through the use of poly lines, etc. described above. At block 127, contrast (e.g., color difference between object of interest and environment (e.g., clothing of interloper, background, other persons in the area, etc.); the RGB (or similar) levels of the object of interest may be compared with the RGB (or similar) levels of an area surrounding the object of interest, a bounding box/polygon may be expanded to include the object of interest as well as part of the immediate background in the image relative to the object of interest).

The frames, some or all of which may include bounding boxes, bounding polygons, and/or annotations, may be entered into the DAB 116. The DAB 116 may be searchable by the associated metadata (e.g., bounding boxes, bounding polygons, annotations/labels, etc.) At block 117, data augmentation may be used to refine the metadata. As a non-limiting example, a bounding box and/or bounding polygon may be adjusted to better fit the object of interest. Examples of these adjustments include translating, rotating, expanding, contracting the one or more sides of the bounding box or bounding polygon. A centroid of the bounding box/polygon (which may be one or more pixels) may be determined. The centroid may be determined based on, e.g., the intersection points of two or more sides of the bounding box/polygon, the maximum and minimum x-coordinates of the bounding box/polygon, the maximum and minimum y-coordinates of the bounding box/polygon, or combinations thereof. The maximum and minimum coordinate values may be determined by the row and/or column number of pixels in the underlying frame/image using a predetermined location of the frame/image as the origin of the coordinate system. Other data that may be modified to further augment training data includes, but may not be limited to, contrast, color levels, brightness, saturation, and hue.

At block 118, a false positive reinforcement model may supply data to adjust the data augmentation feature described above. As a non-limiting example, false positives may be saved periodically, or from time-to-time, and may be incorporated, in whole or in part, into the iterative training process. The false positive reinforcement model may also supply data to be entered into the database including typical model outputs including, but not limited to, confidence score, event duration, pixel area size, object speed, minimum range of object movement, average object size, and average pixel speed. This data may be used to seed the annotation process with pre-existing data.

The Training Phase 130 of the IVS system 100 may include one or more training processes, as described herein throughout the present disclosure. At block 131, information from the DAB 116 may be used in whole or may be filtered for testing a model training hypothesis. Non-limiting examples of filtering include use of a particular type of label, group of labels, and/or number of labels (block 141); use of a particular image, group of images, and/or number of images (block 142); use of a bounding box and/or bounding polygon (either augmented or not) (block 145); and combinations thereof. Additionally or alternatively, the classification data in blocks 121-127 may be used for filtering.

Additionally and/or alternatively, at block 132, information from the DAB 116 may be used in whole or may be filtered for training specialized models. Non-limiting examples of filtering include use of a bodycam or a camera in an elevator (block 143); use of a high or low resolution camera (block 144); use in an outdoor environment (block 146); use in low light conditions, which may include infrared and/or thermal imaging (block 147); and combinations thereof. Additionally or alternatively, the classification data in blocks 121-127 may be used for filtering.

At block 133, weapon detection model training, as described herein, takes place using input from one or more of the DAB 116, the model training hypothesis at block 131, and/or the specialized model training at block 132.

The Testing Phase 150 of the IVS system 100 may include one or more testing processes, as described herein throughout the present disclosure. At block 151, the output of the weapon detection model training at block 133 may be input into a standardized model performance testing and evaluation process. This process may also receive input from the FP reinforcement model 118. A predetermined annotated testing video may be employed to test and judge a model's performance, including detections, false positives, true positives, and for measuring the accuracy of the location, orientation, size, etc. of bounding boxes/polygons. The standardized model performance testing and evaluation process at block 151 may use as input one or more of video file inference testing (block 152) or live testing (block 153). Live testing may include input from model evaluation (block 172). The testing may include the computation and/or compilation of a number of metrics (block 154), such as, e.g., detections (hits/true positives), false positives, false negatives, average score, label performance, score by distance, standard deviation of scores; and combinations thereof The Deployment/Analytics Phase 170 of the IVS system 100 may include deployment/analytics processes, as described herein throughout the present disclosure. At block 171, the output of the standardized model performance testing and evaluation (block 151) may be input into the smart, custom model deployment and performance analytics process. Additionally, the process at block 171 may receive input from the FP performance model (block 118) and/or from the model evaluation process (block 172). Model evaluation (block 172 may receive input from metrics (block 154) and may provide feedback to the video capture at block 111.

The model evaluation process in block 172 may include an intelligent model deployment ("IMD"). The IMB may allow intelligent video surveillance systems to autonomously deploy optimal models for a given environment based on both inputs from the site and sensor, as well as data from a model testing scorecard. The IMD may enable the deployment of the best performing model for any video camera sensor at any given time based on observable, definable sensor variables and site conditions. Instead of relying on informed, but ultimately subjective, human decisions about model deployment, the IMD may determine the best model using an algorithm that selects a model from a database of deployable models based on performance metrics relevant to the environment defined by the aforementioned variables and conditions. Feedback maybe provided to the video capture at block 111, and the process may iterate and updated modeling may be used to capture and store additional data in the DAB 116.

In an example, the IVS System 100 may be able to analyze and/or detect differing environmental conditions/ characteristics in real-time surveillance video. This may be accomplished, in an example, by a dedicated environmental sensor that may be operatively coupled to the microprocessor. Upon receipt of the signal, which may be representative of an analyzed and/or detected environmental condition/ characteristic, the microprocessor may dynamically select a situation-specific model (such as a neural network model or pre/post processing method) from an existing set of models and/or algorithms to perform the inference and/or identification and/or detection function on the real-time surveillance video.

Figure 2:
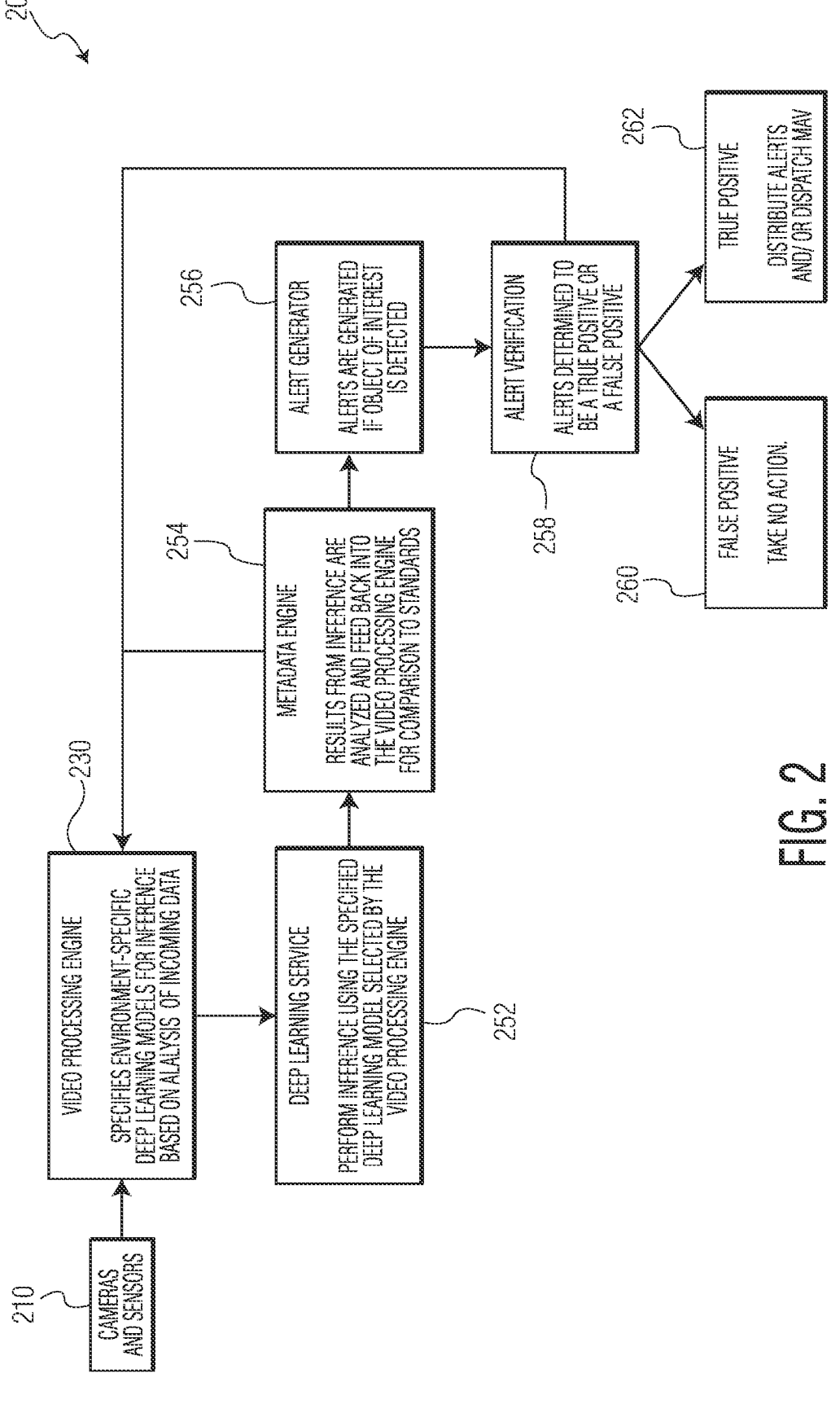
FIG. 2 is a diagram of a method that may be used to detect and/or identify one or more objects of interest and generate an alert, according to an example of the present disclosure.

Referring now to FIG. 2, a diagram of a method 200 that may be used to detect and/or identify one or more objects of interest and generate an alert is shown. At block 210 video data may be collected/recorded for processing. In an example, the recorded video data may be taken from stationary security cameras, cameras associated with devices in the Internet of Things ("IOT"), and/or cameras mounted on and/or incorporated into one or more vehicles, either manned or unmanned (e.g., MAVs) in real-life environments and/or artificially-created environments that simulate a real scenario, as discussed above. The security cameras may be situated so as to have a particular viewpoint, such as, for a non-limiting example, a viewpoint from a position 10-12 feet above ground level or a viewpoint encountered at a client site to be monitored. This viewpoint may result in images that are encountered in typical security footage and which are not found in standard image databases. The IOT cameras may have a viewpoint from a similarly-situated IOT device in a real-life environment.

The recorded videos are split into frames/images and the frames/images are uploaded into the video processing engine ("VPE") 230, where e.g., neural networks are trained on the collected data. In an example, a few key/chosen frames/images, as discussed above, are uploaded to a deep learning service ("DLS") 252, where the key frames/images are those that appear to contain a possible item of interest, such as a weapon. The number of key frames may vary depending on a variety of factors, such as those factors discussed above, and may be 1-2 frames in number, 1-5 frames in number, 1-10 frames in number, and all subranges therebetween. In an example, the videos recorded in block 210 may be split into two categories. The first category are videos that are sent to the DLS 252 for model training. In an example, approximately 80% of the videos are placed in the first category and approximately 20% of the videos are placed in the second category, although the present disclosure contemplates that the division (or split) between first and second category videos may be configurable. The percentage of videos placed in the first category may be between 90% and 70%, between 80% and 60%, between 85% and 50%, less than 50%, and all subranges therebetween.

A model architecture (i.e., a program with a string of algorithms) may be run through the VPE 230 a number of times, each time resulting in a different "model." The model architecture may be a commercially-available program or, in an example, the model architecture may be changed to account for the particular situation and/or problem to be solved. The model architecture may include one or more of Optical Flow (flow of data within an image, directional analysis of where objects are moving), PeopleNet (person and face detection), TrafficCamNet (vehicle/person detection from traffic cameras), DashCamNet (vehicle/person detection from dashboard cameras), license plate and license plate character detection, PeopleSegNet (detection of people using segmentation instead of boundary boxes and can use semantic or instance segmentation), FaceDetect (close up facial recognition using one or more of visible light and infrared (IR) light), GazeNet (determines where a person is looking), human emotion classification, HeartRateNet (estimates human heart rate based on facial image), Gesture Recognition (determines human gestures such as thumbs up and 'ok' sign), body pose estimation, facial landmark estimation (detects eyes, ears, nose, etc. for high end facial recognition), natural language processing (NLP) conversational AI (neural net for understanding human language), and super resolution. The model architecture may detect motion, such as human motion recognition. Object tracking may allow for tracking of a detected object within a specific timeframe. The object tracking and/or human detection may happen on a single camera or it may transfer from camera to camera. In an example, instead of just determining that a human is detected, the model architecture may assign a label/identification to that human and may be able to detect if that same human is seen again within the same camera or a different sensor on the software network.

Depending on the model type and the cameras and sensors 210 being used to capture footage, parameters of the model may be adjusted. For example, an object of interest captured via a MAV (e.g., a drone) would be smaller than the same object of interest capture via a security camera as the distance between the object and the camera and sensor 210 will differ.

The different models may be the result of the different runs of the model architecture through the VPE 230. In an example, the model architecture makes an 80/20 split, as discussed above, for videos in the first and second category, respectively. However, the videos that are applied to the split are random. Put another way, in a first run, the 80% of videos that are put in the first category are not all the same as the 80% of videos that are put in the first category in a second run. Thus, in the first run and the second run, the model architecture may be trained on a different set of videos which result in different models (which may perform differently from each other). Varying the split between runs also results in different models.

The second category are testing videos which may be converted to MP4 videos. These testing/verification videos may be used for input into the DLS at block 252. In an example, it may be important to not intermingle the first and second category of videos so as to avoid skewing the subsequent test results.

The frames/images for modeling may be uploaded to the VPE 230. The number of images that are uploaded may be 1-1000, 500-5000, 10-10,000, 1-10,000, and all subranges therebetween. In an example, more than 10,000 images may be uploaded. Bounding boxes/polygons may be drawn and/ or edited (e.g., smoothed, cleaned-up, revised, altered, removed, added, etc.) around items of interest in one or more of the images. The edited frames/images may then be used to train detection models which may include modifying the parameters available in the deep learning training server, as discussed above. The parameters are adjusted to improve the performance of the detection model, such as, for example, how fast or slow the detection model learns or how many times the detection model analyzes a particular frame/image. The trained models are analyzed to identify one or more high-performing models. In an example, the performance of a model being tested may be compared to the performance of one or more previous models to determine whether or not the model being tested is an improvement over the one or more previous models. If the model being tested outper- forms the one or more previously tested models during the initial testing, the model being tested may then be exported and deployed for more detailed testing in the DLS 252.

In an example, the models are trained using a very diverse data set/content of training videos. The data set may include, but is not limited to, the use of multiple images of a particular weapon, multiple different weapons, multiple environmental scenes (e.g., sunny, overcast, rainy, snowy, etc.), multiple lighting conditions (e.g., direct sunlight, indi- rect sunlight, artificial lighting at night—lamp posts, flood lights, infrared, etc.), various distances from the recording video camera, various viewing angles of the recording video camera, skin tone of potential shooters hand, hand position of potential shooter, height of potential shooter, speed of advance of the potential shooter, type of clothing worn by potential shooter, orientation of weapon (e.g., held vertical, horizontal, on the shoulder, at port arms, in an aiming position, etc.), and other pertinent data.

At the DLS 252, the videos from block 230 may be run to analyze the high-performing models. The analysis may include going through the testing videos frame-by-frame for those frames which include a detection to identify where in a frame a weapon or object of interest appears. In an example, the DLS 252 runs may comprise one or more of the testing videos that were not used in the DLS 252. The output of the DLS 252 may replicate the output of real-time inference with metadata including object size, object speed, event duration, and confidence score, among other param- eters. The DLS 252 output may be exported and, in an example, a data exporter tool may be used to format the metadata output into an Excel file or other file.

In an example, feedback may be employed to further refine a model. For example, a video may be taken of a test situation for a trained model. That video may be used to retrain the model. In an example, the video of the test situation may be added to the existing set of training videos for the trained model and the trained model may be retrained using the expanded set of training videos. In an example, the retraining procedure may only use the video of the test situation. In an example, the retraining procedure may only use the video of the test situation combined with a subset of the set of training videos, where the subset may be 75% of the set, 50% of the set, between 25-75% of the set, less than 25% of the set, between 10% and 90% of the set, and all subranges therebetween.

A metadata engine 254 may be used to identify false positive vs. true positives and filter the results. In an example, results from an inference run may be analyzed and fed back into the VPE 230 for comparison to known standards. In an example, false positives and true positives are counted based on the event parameters of each detection including, e.g., object size, object speed, event duration, movement distance, movement direction, color, background contrast, and confidence score. Other event parameters are contemplated by the present disclosure. In another example, the filters that may be used are selected from the group of Event Duration, Confidence Score, Average Object Size, and Average Pixel Speed. In an example, Event Duration may be the time duration in which an "event" (e.g., an appearance of an item of interest, such as a weapon, until the item of interest no longer appears) occurs. In certain examples, Event Duration may be at least 1 sec., at least 2 sec., at least 5 sec., between 1-10 sec., and all subranges therebetween. In an example, the Confidence Score may be at least 97%. In certain examples, the Confidence Score may be about 10% or about 50% and all subranges therebetween. In another example, the Confidence Score may be in the range from about 96% to about 98%, from about 95% to about 99%, from about 94% to about 99%, and all subranges therebe- tween. In an example, the Confidence Score may be an output value from the inference process, such that an image input to the DLS 252 may be analyzed and the DLS 252 may respond with how confident it is that the object it identified matches the criteria for detection. In an example, the Aver- age Object Size may be determined from the number of pixels within a bounding box around the object (e.g., an item of interest, such as a weapon). In an example, the Average Pixel Speed may be a determination of how fast the item of interest moves from one position in one frame to another position in another frame.

The filtered results may be used to analyze model per- formance by determining which metadata filters produce the highest number of true positives with the lowest number of false positives. The metadata output values are saved and maybe used to determine the minimum and maximum parameters for triggering alerts by an alert generator 256. Once an alert is generated, it may be verified via an alert verification 258 process to determine whether it is a false positive 260 or a true positive 262. If it is a false positive 260, no action may be taken. If it is a true positive 262, one or more alerts may be distributed to personnel (via one or more devices) and to /or one or more MAVs, enabling the personnel and/or or more MAVs to take action. The alert verification 258 process may be manual or it may be automatic. For example, once an alert is generated, it may be transmitted to a manager cluster located in, for example, an operations center (not shown) where it may be reviewed by a user. The alert may include an annotated frame indicating the object of interest. The user may visually inspect the annotated frame and determine if the identified object of interest is genuine (i.e., a true positive) or false (i.e., a false positive). In another example, the alert verification process may be performed automatically without user interaction.

Additionally, the DLS 252 may be configured using the determined parameters and the top performing model may be designated as the model to be run by the DLS 252.

The method 200 may run on the IVS system 100, which includes one or more microprocessors and/or a memory device. In an example, the IVS system 100 may be server- based. For example, a server executing the VPE 230, DLS 252, metadata engine 254, alert generator 256, and alert verification 258 processes may be remote from the one or more cameras and sensors 210, but may be in communica- tion with the one or more cameras and sensors 210 via a communications network.

Figure 3:
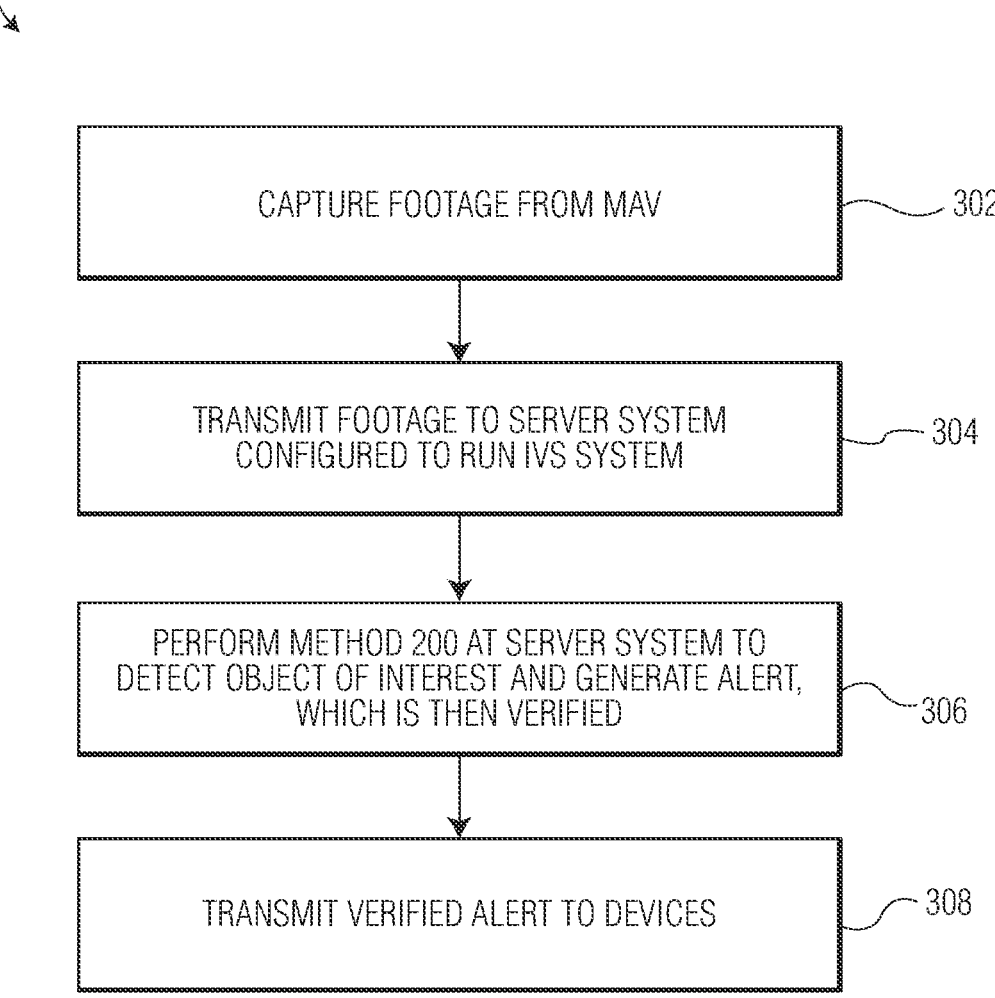
FIG. 3 is a flow chart illustrating a server-based object detection and response method, according to an example of the present disclosure.

Referring now to FIG. 3, a flow chart illustrating a server-based object detection and response method 300 is shown. At step 302, a MAV may record live video footage of an area of interest. At step 304, the MAV may transmit the live video footage to a server system configured to run the IVS system 100 via a communications interface. At step 306, the server system may perform the method 200 to detect an object of interest, and if so, generate an alert. Once the alert is verified (either manually or automatically as described above), it may be transmitted to one or more devices to notify human personnel at step 308. The alert may include information about the location of the object of interest based on, at least, sensor information (e.g., GPS coordinates and/or longitude, latitude, and altitude) from the MAV.

Figure 4:
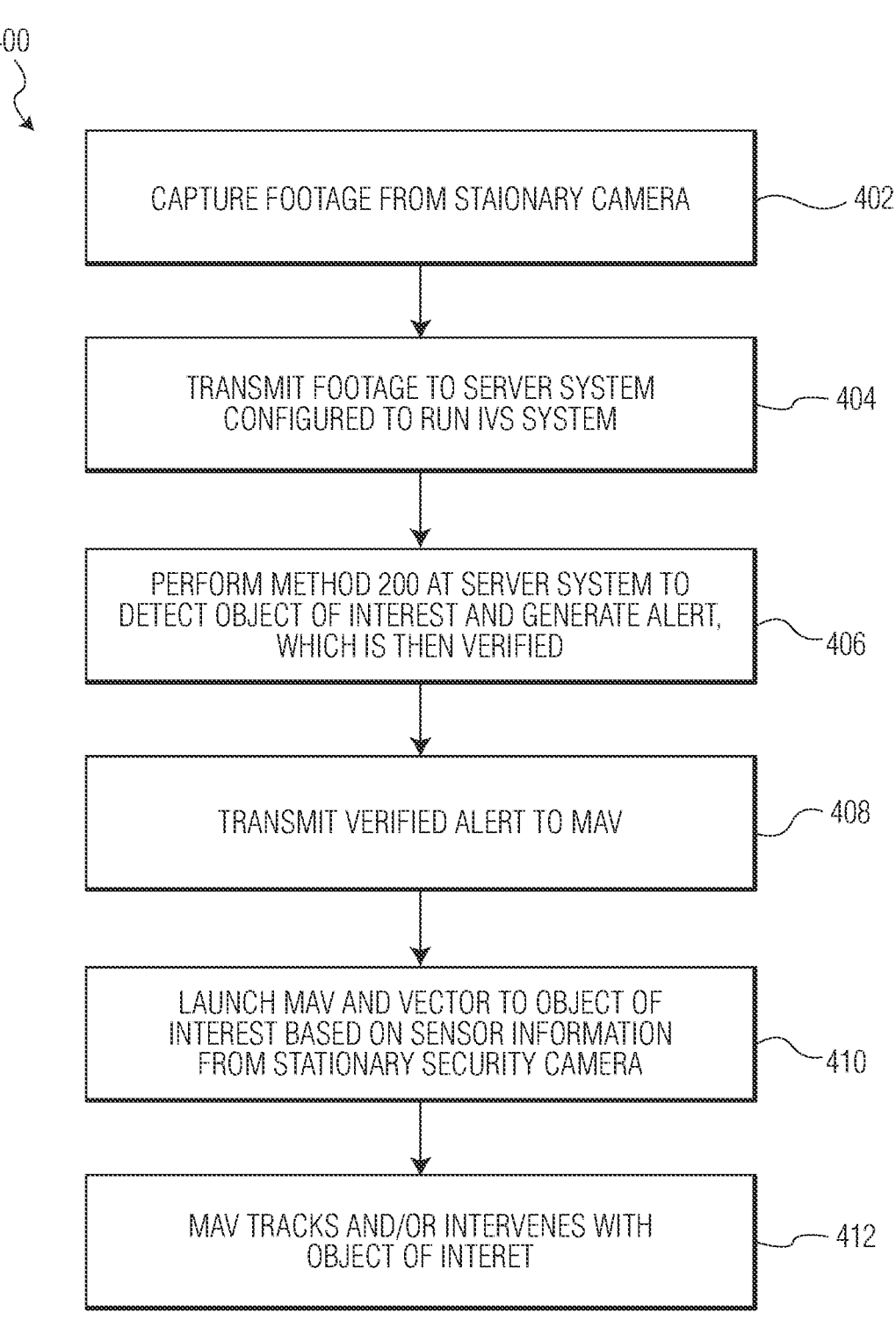
FIG. 4 is a flow chart illustrating an example of a server-based object detection and mobile autonomous vehicle (MAV) response method, according to an example of the present disclosure.

Referring now to FIG. 4, a flow chart illustrating an example of a server-based object detection and MAV response method 400 is shown. At step 402, a stationary camera may record live video footage of an area of interest. At step 404, the stationary camera may transmit the live video footage to a server system configured to run the IVS system 100 via a communications interface. At step 406, the server system may perform the method 200 to detect an object of interest, and if so, generate an alert. Once the alert is verified (either manually or automatically as described above), it may be transmitted to a MAV at step 408. At step 410, the MAV may be automatically launched once it receives the alert and may be vectored to the object of interest based on, at least, sensor information (e.g., GPS coordinates and/or longitude, latitude, and altitude) from the stationary camera. In an example, the MAV may be equipped with mission planning software that may autonomously plot a course from the on-site location of the drone to the location of the object of interest provided by the sensor information. The mission planning software may be programmed with a detailed map of the patrolled area.

At step 412, the MAV, which may be equipped with one or more camera sensors itself, may automatically detect and track the identified object of interest. In addition to the detection and tracking capabilities, the MAV may be equipped with threat neutralization and/or distraction countermeasures (e.g., a taser, tear gas, strobe lights, sirens, etc.) and may intervene with the object of interest. In an example, an operations center staffed with drone pilots may serve as a human in the loop (HITL). Once the MAV has arrived at the site of the threat detection, it may hover at a safe altitude until a human pilot takes control remotely from the operations center, at which time the MAV may engage the threat.

It should be noted that method 300 and method 400 may be used together. For example, an alert may be sent to both one or more devices used by personnel and the MAV.

In another other example, the IVS system 100 may be entirely incorporated into the one or more cameras and sensors 210 themselves. For example, the one or more cameras and sensors 210 may include a MAV (e.g., a drone) that may be configured to perform the real-time video analytics on-board. Once an object of interest is detected and confirmed, the MAV may be able to track the threat and, either automatically or through the intervention of a human operator, target and engage the object of interest. While some off-the-shelf drones are enabled with tracking capabilities, they may rely on human input. A MAV configured with the IVS system 100 and performing the method 200 may allow for automatic patrol and detection of objects of interest, requiring human intervention only when an object of interest is confirmed. In addition to automatic detection and tracking capabilities, the MAV may be equipped with threat neutralization and/or distraction countermeasures (e.g., a taser, strobe lights, sirens, etc.). The MAV configured with the IVS system 100 may enable automation of patrol routes and may be able to automatically dispatch backup security assets (e.g., personnel and/or additional MAVs) to the location of a threat. Whereas off-the-shelf drone video analytics may use a central processing unit (CPU) to capture and transmit images, the MAV configured with the IVS system 100 may also include an edge graphics processing unit (GPU) enabled to provide more powerful and accurate real-time detection.

Figure 5:
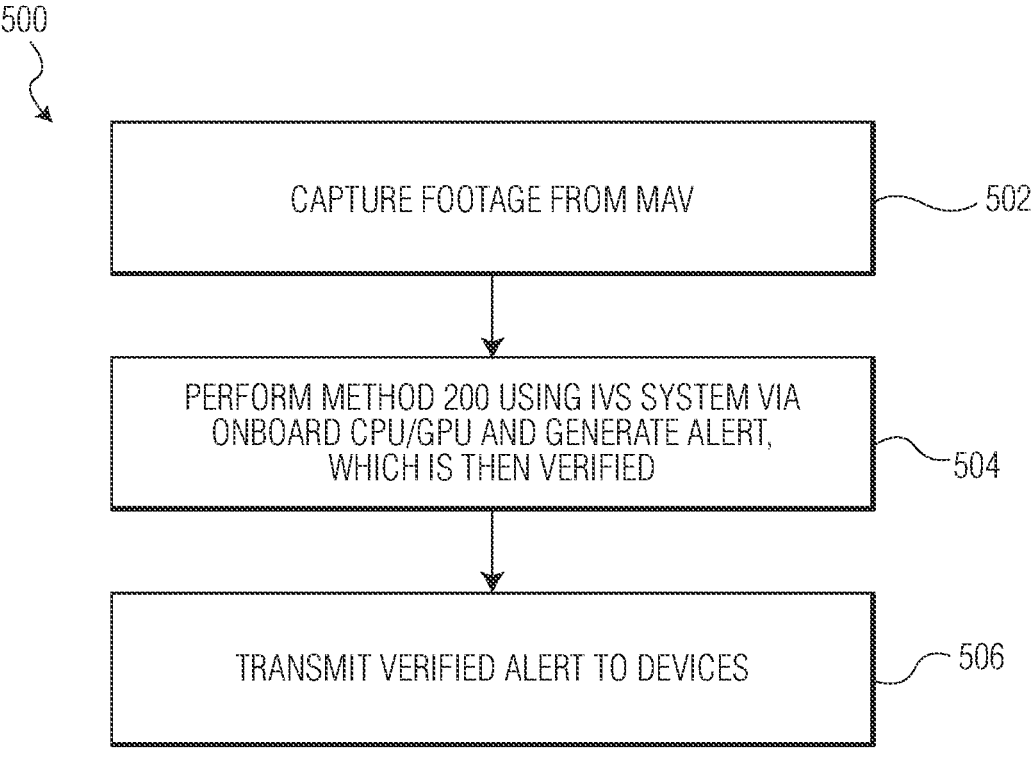
FIG. 5 is a flowchart illustrating an edge-based object detection and response method, according to an example of the present disclosure.

Referring now to FIG. 5, a flowchart illustrating an edge-based object detection and response method 500 is shown. At step 502, a MAV may record live video footage of an area of interest. At step 504, the MAV may perform the method 200 using the IVS system 100 via an onboard one or more of a CPU/GPU/TPU/NPU to detect an object of interest, and if so, generate an alert. Once the alert is verified (either manually or automatically as described above), it may be transmitted to one or more devices to notify human personnel at step 506. The alert may include information about the location of the object of interest based on, at least, sensor information (e.g., GPS coordinates and/or longitude, latitude, and altitude) from the MAV. The MAV may automatically detect and track the identified object of interest. In addition, to the detection and tracking capabilities, the MAV may be equipped with threat neutralization and/or distraction countermeasures (e.g., a taser, tear gas, strobe lights, sirens, etc.) and may intervene with the object of interest. In an example, an operations center staffed with drone pilots may serve as a human in the loop (HITL). Once the MAV has detected the object of interest, it may hover at a safe altitude until a human pilot takes control remotely from the operations center, at which time the MAV may engage the threat.

Figure 6:
FIG. 6 is a flow chart illustrating an example of an edge-based object detection and MAV response method, according to an example of the present disclosure.
Figure 6:
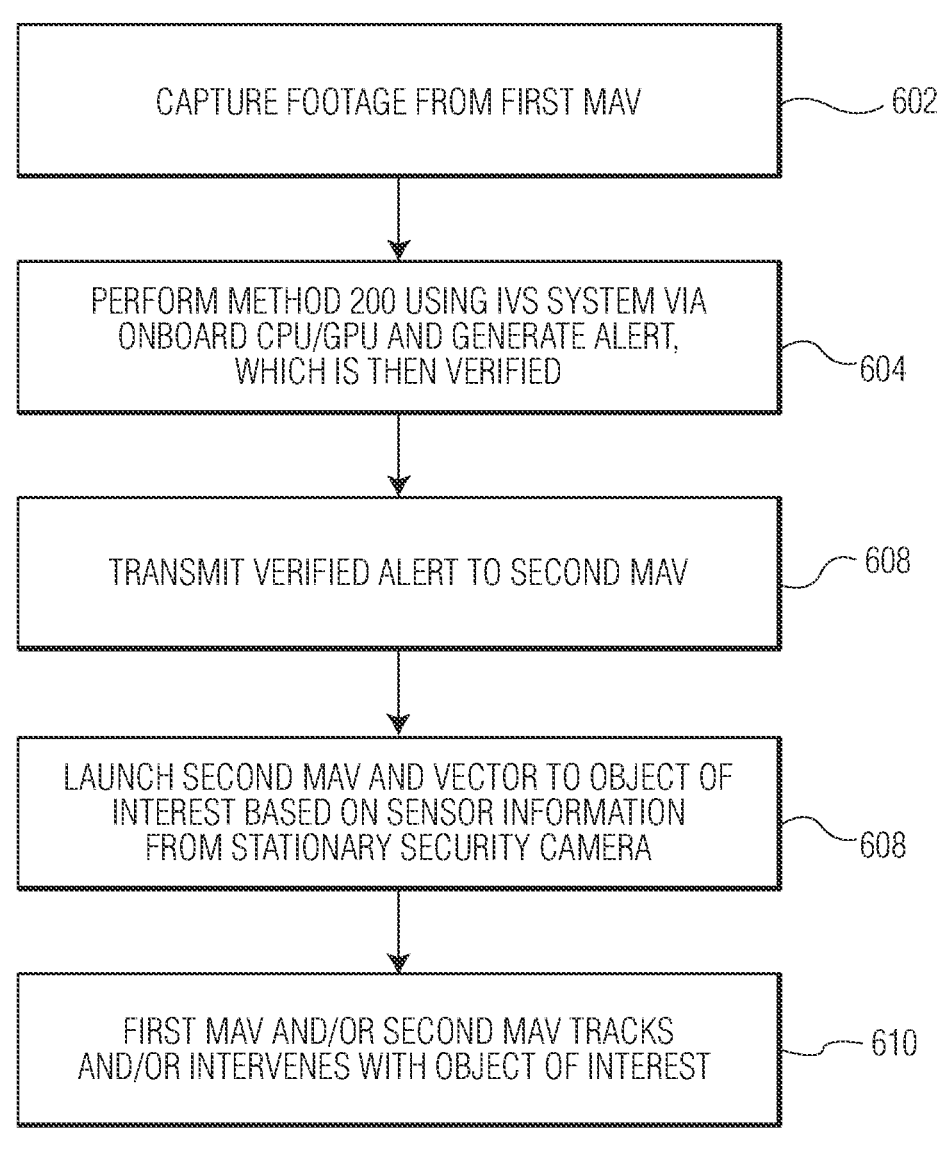

Referring now to FIG. 6, a flow chart illustrating an example of an edge-based object detection and MAV response method 600 is shown. At step 602, a first MAV may record live video footage of an area of interest. At step 604, the first MAV may perform the method 200 using the IVS system 100 via an onboard CPU/GPU to detect an object of interest, and if so, generate an alert. Once the alert is verified (either manually or automatically as described above), it may be transmitted to a second MAV at step 606. At step 608, the second MAV may be automatically launched once it receives the alert and may be vectored to the object of interest based on, at least, sensor information (e.g., GPS coordinates and/or longitude, latitude, and altitude) from the first MAV. The second MAV may be equipped with mission planning software that may autonomously plot a course from the on-site location of the drone to the location of the object of interest provided by the sensor information. The mission planning software may be programmed with a detailed map of the patrolled area.

At step 610, the first MAV and/or the second MAV, which may be equipped with one or more camera sensors itself, may automatically detect and track the identified object of interest. In addition, to the detection and tracking capabilities, the first MAV and/or the second MAV may be equipped with threat neutralization and/or distraction countermeasures (e.g., a taser, tear gas, strobe lights, sirens, etc.) and may intervene with the object of interest. In an example, an operations center staffed with drone pilots may serve as a human in the loop (HITL). The first MAV and/or the second MAV, once it has arrived at the site of the threat detection, may hover at a safe altitude until a human pilot takes control remotely from the operations center, at which time the first MAV and/or the second MAV may engage the threat.

It should be noted that method 500 and method 600 may be used together. For example, an alert may be sent to both one or more devices used by personnel and the second MAV.

The methods described above may provide enhanced integration between existing AI software and existing MAVs for an added layer of protection. The method may reduce response time that may buy back critical minutes and

Figure 7:
FIG. 7 is an exemplary processing system which can perform the functions and/or methods shown in any of FIGS. 1-6, according to an example of the present disclosure.
Figure 7:
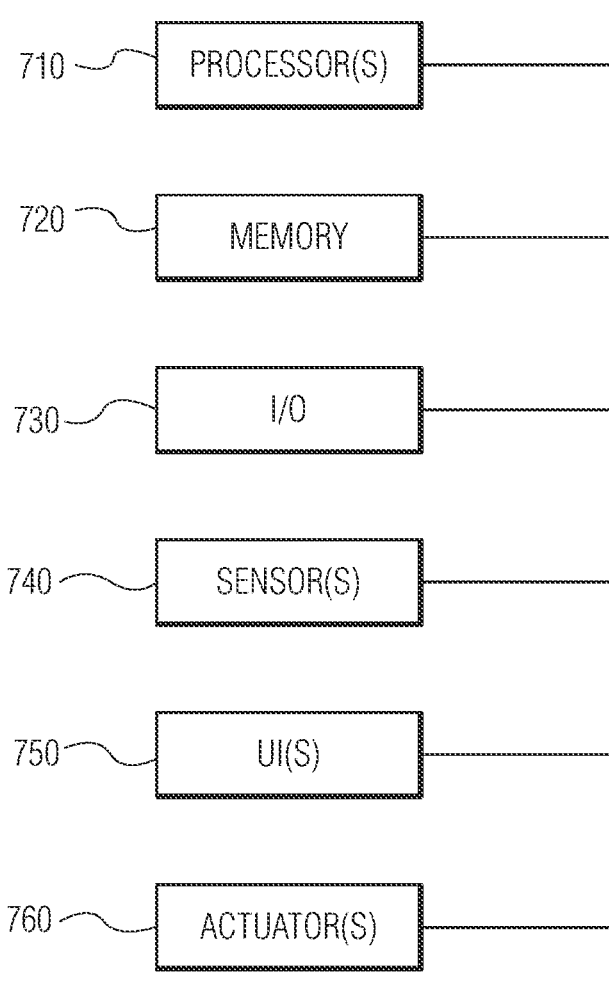

15 seconds to allow human personnel to mount an effective response and provide an added layer of protection for the human personnel FIG. 7 is an exemplary processing system which can perform the functions and/or methods shown in any of FIGS. 1-6. Processing system 700 may include one or more processors 710, memory 720, one or more input-output devices 730, one or more sensors 740, one or more user interfaces 750, and one or more actuators 760. Processing system 700 can be distributed.

Processor(s) 710 may be microprocessors and may include one or more distinct processors, each having one or more cores. Each of the distinct processors may have the same or different structure. Processors 710 may include one or more central processing units (CPUs), one or more graphics processing units (GPUs), circuitry (e.g., application specific integrated circuits (ASICs)), digital signal processors (DSPs), and the like. Processors 21 may be mounted on a common substrate or to different substrates.

Processors 710 may be configured to perform a certain function, method, or operation at least when one of the one or more of the distinct processors may be capable of executing code, stored on memory 720 embodying the function, method, or operation. Processors 710 may be configured to perform any and all functions, methods, and operations disclosed herein.

For example, when the present disclosure states that processing system 700 performs/may perform task "X," such a statement conveys that processing system 700 may be configured to perform task "X." Similarly, when the present disclosure states that a device performs/may perform task "X," such a statement conveys that the processing system 700 of the respective may be configured to perform task "X." Processing system 700 may be configured to perform a function, method, or operation at least when processors 710 may be configured to do the same.

Memory 720 may include volatile memory, non-volatile memory, and any other medium capable of storing data. Each of the volatile memory, non-volatile memory, and any other type of memory may include multiple different memory devices, located at multiple distinct locations and each having a different structure. Examples of memory 720 include a non-transitory computer-readable media such as RAM, ROM, flash memory, EEPROM, any kind of optical storage disk such as a DVD, a Blu-Ray™. disc, magnetic storage, holographic storage, an HDD, an SSD, any medium that may be used to store program code in the form of instructions or data structures, and the like. Any and all of the methods, functions, and operations described in the present application may be fully embodied in the form of tangible and/or non-transitory machine-readable code saved in memory 720.

Input-output devices 730 may include any component for trafficking data such as ports, antennas (i.e., transceivers), printed conductive paths, and the like. Input-output devices 730 may enable wired communication via USB™, Display-Port™, HDMI™, Ethernet, and the like. Input-output devices 730 may enable electronic, optical, magnetic, and holographic, communication with suitable memory 720. Input-output devices 430 may enable wireless communication via Wi-Fi, Bluetooth™, cellular (e.g., LTE., CDMA., GSM., WiMax, NFC, etc.), GPS, and the like. Input-output devices 730 may include wired and/or wireless communication pathways.

Sensors 740 may capture physical measurements of environment and report the same to processors 710. Examples of sensors 740 include photosensors. User interface 750 may include displays (e.g., LED touchscreens (e.g., OLED touchscreens)), physical buttons, speakers, microphones, keyboards, and the like. Actuators 760 may enable processors 710 to control mechanical forces. For example, actuators may be electronically controllable motors (e.g., motors for panning and/or zooming a video camera).

What is claimed is:

1. An object detection and response method, the method comprising:
  receiving a video stream from a camera sensor of one or more of a stationary camera and a first mobile autonomous vehicle ("MAV");
  selecting a set of frames from the video stream;
  detecting, by a machine learning model, a presence of an object in one or more frames of the set of frames;
  inserting, by the machine learning model, bounding boxes in an area of the object in each of the one or more frames;
  annotating, by the machine learning model, the bounding boxes with one or more attributes of the object;
  storing the one or more frames and the annotated bounding boxes in a database, the database configured to be searchable by at least one attribute of the one or more attributes;
  determining whether the object is true positive ("TP") event or a false positive ("FP") event;
  re-training the machine learning model using one or more of the database and the determination; and
  if it is determined that the object is a TP event, directing a second mobile autonomous vehicle ("MAV") to a location of the object, wherein the location of the object is determined by location information associated with the camera sensor.

2. The method of claim 1, wherein the re-training comprises varying one or more parameters of the machine learning model.

3. The method of claim 2, wherein the one or more parameters are associated with one or more characteristics of the camera sensor.

4. The method of claim 1, wherein the location information comprises one or more of global positioning system ("GPS") coordinates and longitude, latitude, and altitude.

5. The method of claim 4, wherein the machine learning model is executed by a server system in communication with the camera sensor and the one or more devices via a communications interface.

6. The method of claim 4, wherein the machine learning model is executed by one or more of the first MAV and the second MAV in communication with the one or more devices via a communications interface.

7. The method of claim 1, wherein the second MAV is configured to automatically launch and travel to the location of the object and one or more of track the object with camera sensors and intervene with one or more threat neutralization and/or distraction countermeasures.

8. The method of claim 7, wherein the intervening with one or more threat neutralization and/or distraction countermeasures is controlled manually by a user.

9. The method of claim 1, wherein the determining whether the object is a TP or a FP is done manually by a user.

10. The method of claim 1, wherein the determining whether the object is a TP or a FP is done automatically by the machine learning model.

11. A system for object detection and response, the system comprising:

a processor operatively coupled to a memory configured to store computer-readable instructions that, when executed by the processor, cause the processor to:

receive a video stream from a camera sensor of one or more of a stationary camera and a first mobile autonomous vehicle ("MAV");

select a set of frames from the video stream;

detect, by a machine learning model, a presence of an object in one or more frames of the set of frames;

insert, by the machine learning model, bounding boxes in an area of the object in each of the one or more frames;

annotate, by the machine learning model, the bounding boxes with one or more attributes of the object;

store the one or more frames and the annotated bounding boxes in a database, the database configured to be searchable by at least one attribute of the one or more attributes;

determine whether the object is true positive ("TP") event or a false positive ("FP") event;

re-train the machine learning model using one or more of the database and the determination; and if it is determined that the object is a TP event, directing a second mobile autonomous vehicle ("MAV") to a location of the object, wherein the location of the object is determined by location information associated with the camera sensor.

12. The system of claim 11, wherein the re-training comprises varying one or more parameters of the machine learning model.

13. The system of claim 12, wherein the one or more parameters are associated with one or more characteristics of the camera sensor.

14. The system of claim 11, wherein the location information comprises one or more of global positioning system ("GPS") coordinates and longitude, latitude, and altitude.

15. The system of claim 14, wherein the machine learning model is executed by a server system in communication with the camera sensor and the one or more devices via a communications interface.

16. The system of claim 14, wherein the machine learning model is executed by one or more of the first MAV and the second MAV in communication with the one or more devices via a communications interface.

17. The system of claim 11, wherein the second MAV is configured to automatically launch and travel to the location of the object and one or more of track the object with camera sensors and intervene with one or more threat neutralization and/or distraction countermeasures.

18. The system of claim 17, wherein the intervening with one or more threat neutralization and/or distraction countermeasures is controlled manually by a user.

19. The system of claim 11, wherein the determining whether the object is a TP or a FP is done manually by a user.

20. The system of claim 11, wherein the determining whether the object is a TP or a FP is done automatically by the machine learning model.

\* \* \* \* \*